United States Patent [19]
Murakami et al.

[11] 3,974,888
[45] Aug. 17, 1976

[54] METHOD OF WEIGHING AND APPARATUS THEREFOR

[75] Inventors: Katsuhiko Murakami; Tetsuo Ikeda; Masahiro Takeda; Osamu Kazama; Hidaka Nishinaka, all of Kyoto, Japan

[73] Assignee: Kabushiki Kaisha Ishida Koki Seisakusyo, Kyoto, Japan

[22] Filed: Aug. 30, 1974

[21] Appl. No.: 502,218

[30] Foreign Application Priority Data

Sept. 1, 1973 Japan ............................... 48-98714

[52] U.S. Cl. .................................. 177/52; 177/1; 177/50; 177/122; 209/121
[51] Int. Cl.[2] ................. G01G 13/00; G01G 19/52; B07B 13/08
[58] Field of Search .......... 177/50, 52, 61, 119–123, 177/1; 198/39; 209/121

[56] References Cited
UNITED STATES PATENTS

| | | | |
|---|---|---|---|
| 3,180,475 | 4/1965 | Rosso | 177/119 |
| 3,299,975 | 1/1967 | Stambera et al. | 177/52 |
| 3,434,595 | 3/1969 | Seaborn et al. | 177/50 |
| 3,584,697 | 6/1971 | Danielson | 177/122 |
| 3,708,025 | 1/1973 | Soler et al. | 177/122 |
| 3,720,276 | 3/1973 | Banks | 177/122 |
| 3,846,958 | 11/1974 | Divan | 177/50 |

*Primary Examiner*—L. T. Hix
*Assistant Examiner*—Vit W. Miska
*Attorney, Agent, or Firm*—Hall & Houghton

[57] ABSTRACT

A method of weighing and an apparatus therefor, wherein articles varying in unit weight are continuously weighed by a single weighing machine to classify them into three ranks, one for articles having error weights outside the allowable error limits, another for articles having error weights plus-oriented inside the allowable error limits and the other for articles having error weights minus-oriented inside the allowable error limits, said articles having error weights outside the allowable error limits being rejected, said articles having plus-oriented and minus-oriented error weights inside the allowable error limits being separately pooled and their weights or error weights being allotted to two shift registers and memorized therein in correspondence to the pooling order, and arithmetic operations for combinations of said memorized values are performed to provide a combination of weights equal or most approximate to a predetermined weight. Other merits and details of the construction will be made clear.

6 Claims, 11 Drawing Figures

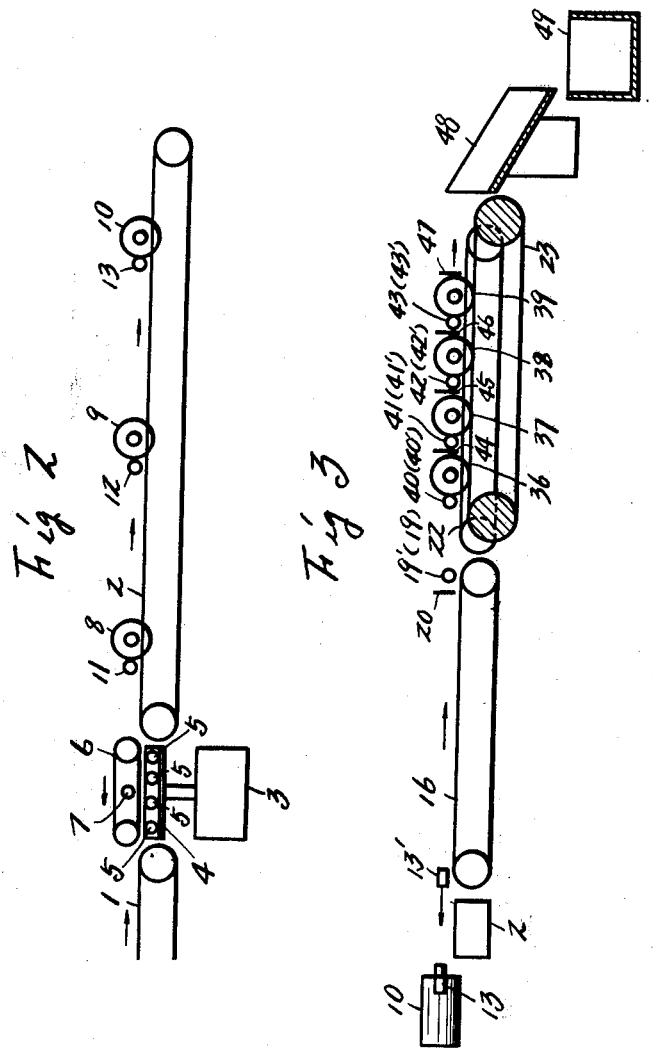

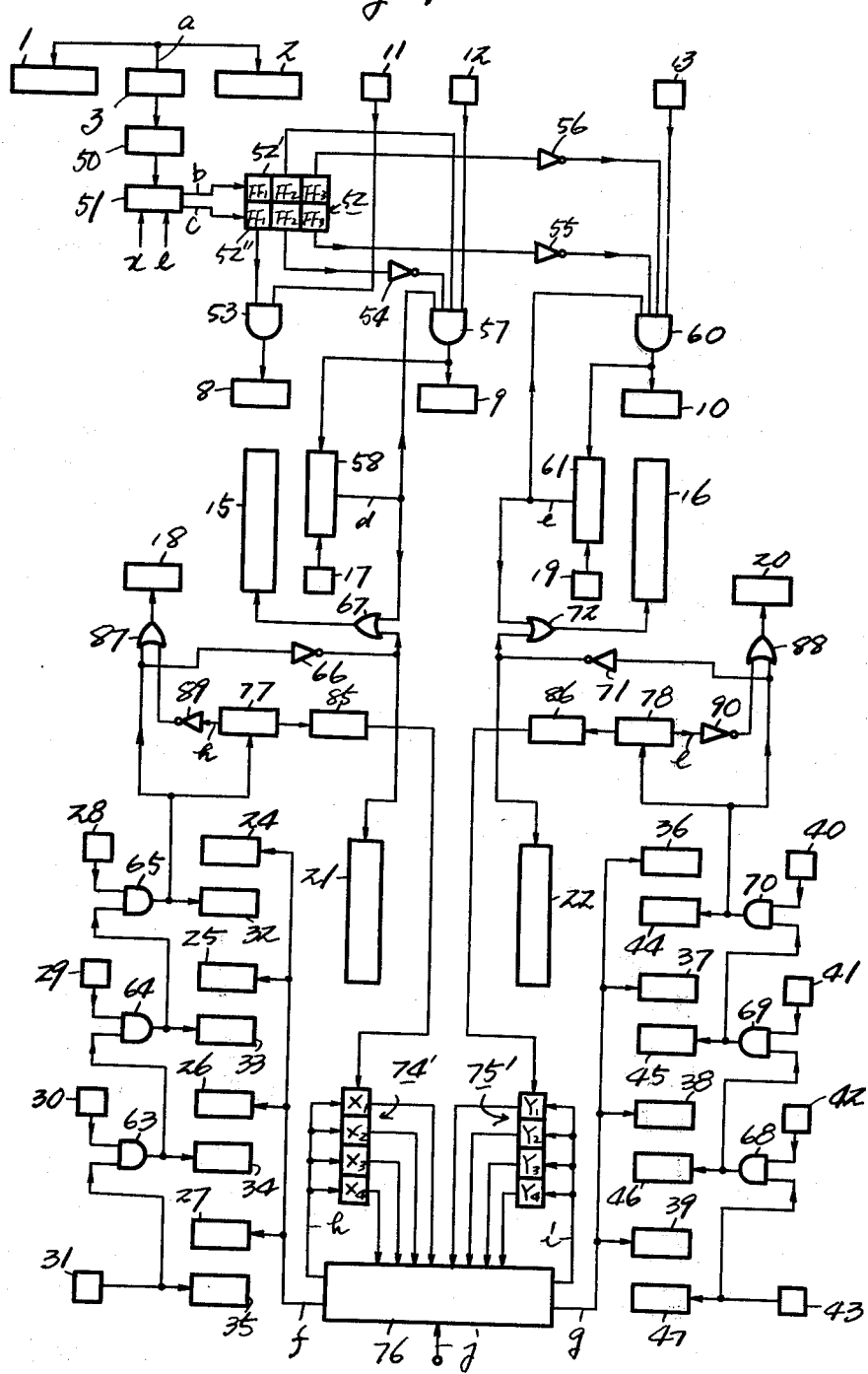

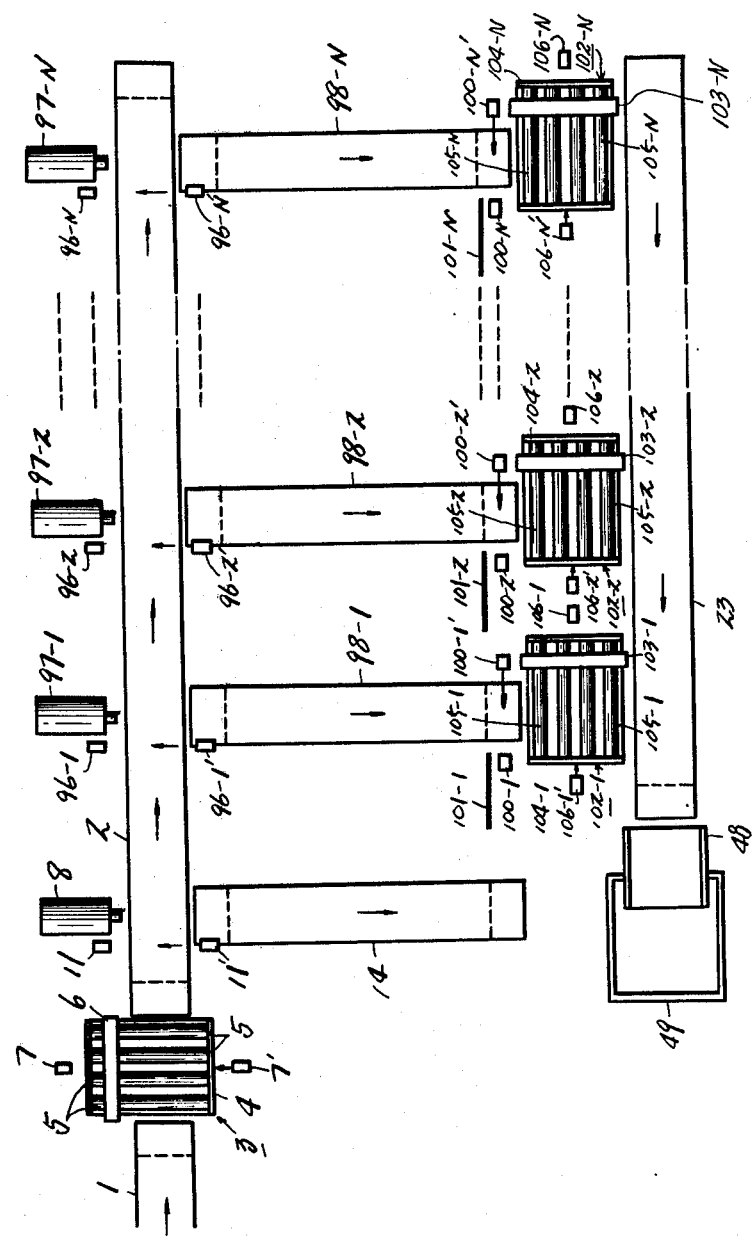

METHOD OF WEIGHING AND APPARATUS THEREFOR

BACKGROUND OF THE INVENTION

1. Field of the Invention

The present invention relates to a method of weighing and an apparatus therefor, wherein articles varying in unit weight are continuously weighed and classified by a single weighing machine, the articles thus weighed are pooled and their weighed values are memorized in correspondence to the pooling order, and arithemetic operations for combinations of the weighed values which have been memorized are performed to provide a combination of weights equal or most approximate to a predetermined weight.

2. Description of the Prior Art

Conventionally, when a plurality of articles are packed in a single box or other container, the total weight will vary if the weight per article (hereinafter referred to as unit weight) contained therein varies. Therefore, the variation in the total weight for each box becomes a problem. As a countermeasure, the number of articles is increased or decreased to adjust the total weight or articles in one box are changed for those in another by utilizing variations in unit weight to adjust the total weight. However, the former method is limited in the number of articles packed per box while the latter method involves a very difficult operation of changing one article for another. In either case, manual operation is involved, taking much time and labor, and business transactions are carried out invariably with a largish (or plus-oriented) weight, so that the loss due to such largish weight amounts to much money.

SUMMARY OF THE INVENTION

The present invention provides a method of weighing and an apparatus therefor, whereby articles varying in unit weight such as supply yarn-wound cores including cheeses and cones, vegetables including onions and potatoes, and fruits including apples and oranges, or other articles such as eggs packed in boxes, containers or bags without being influenced by the variations in unit weight and at any desired preset number of articles with the total weight thereof brought inside the allowable error limits.

FEATURES OF THE INVENTION

The present invention automatically performs the above-described conventional manual operations by utilizing differences in unit weight, at a predetermined number of articles to be packed, with an excess in the total weight in each box brought as close as possible to zero, thereby achieving a rapid boxing operation while saving labor and minimizing loss.

BRIEF DESCRIPTION OF THE DRAWINGS

FIGS. 1 through 4 are views explanatory of a first embodiment of the present invention; FIG. 1 is a plan view; FIG. 2 is a side view looking at FIG. 1 in the direction of the line A—A in FIG. 1; FIG. 3 is a side view looking at the same in the direction of the line B—B; and FIG. 4 is a circuit block diagram;

FIGS. 5 through 7 are views explanatory of a second embodiment of the invention; FIG. 5 is a plan view; FIG. 6 is a side view looking at FIG. 5 in the direction of the line C—C in FIG. 5; and FIG. 7 is a circuit block diagram;

FIG. 8 is a side view; and FIG. 9 is a circuit block diagram; and FIGS. 10 and 11 show a third embodiment of the invention; FIG. 10 is a plan view; and FIG. 11 is a circuit block diagram.

DESCRIPTION OF THE PREFERRED EMBODIMENTS

Figure 1:
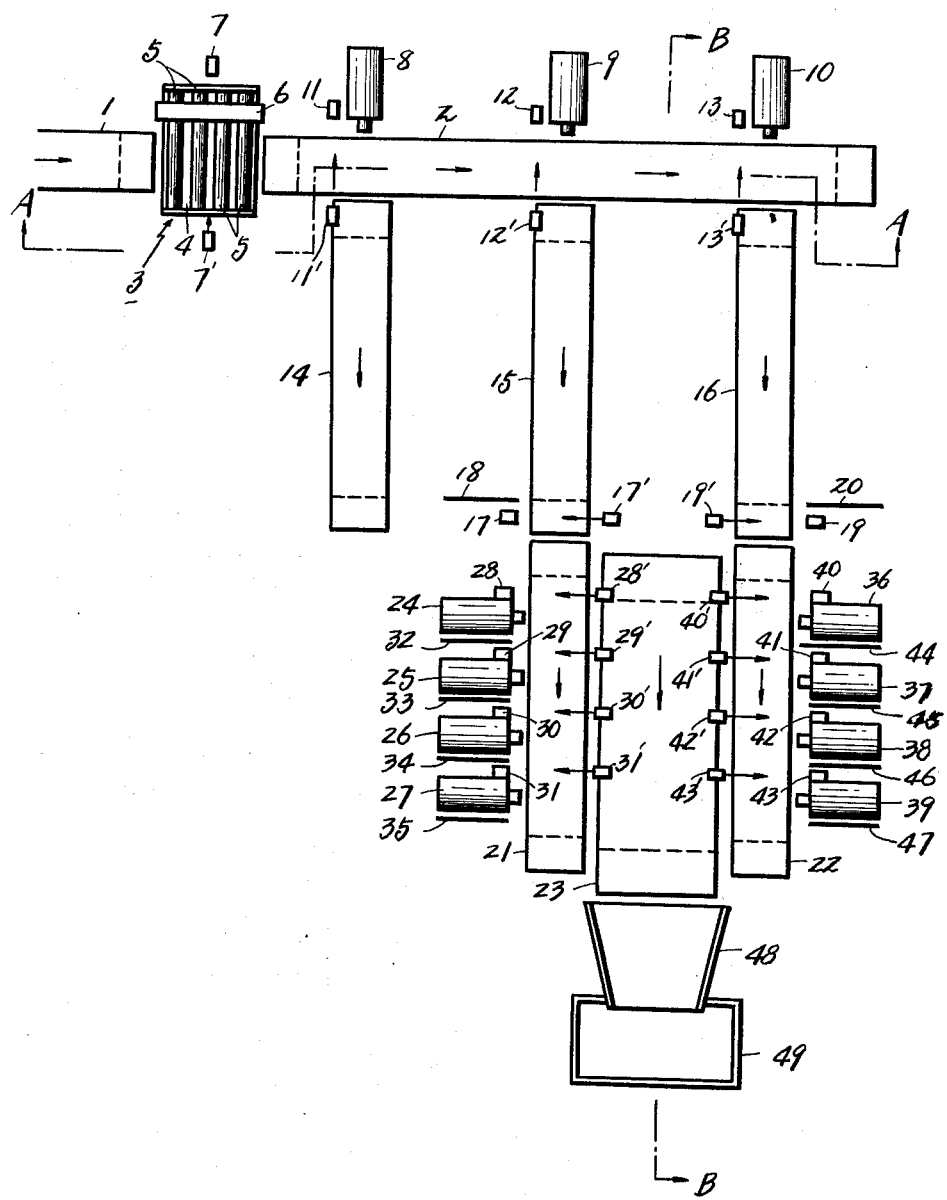

Referring to FIGS. 1 through 3, the character 1 designates a first conveyor; 2, a second conveyor for allotment; and 3 designates a weighing machine positioned intermediate between the two conveyors. A receiver pan 4 has a plurality of rollers 5 rotatabley mounted thereon. A belt 6 is fixed in position and located over and laterally of the receiver pan 4. In response to a weighing completion signal $a$ (see FIG. 4), the first and second conveyors 1 and 2 are moved predetermined distances and the receiver pan 4 is lifted to bring the rollers 5 into contact with the belt 6 to cause the rotation of the rollers. A phototube arrangement 7, 7' detects the arrival of an article at the middle of the receiver pan 4 from the first conveyor 1 to produce a detection output with which the upward movement of the receiver pan is stopped so that the receiver pan is made free, whereupon weighing operation is started. The character 8 designates a discharger for discharging articles having weights other than allowable error weights; 9, a discharger for discharging articles having plus-oriented allowable error weights; and the character 10 designates a discharger for discharging articles having minus-oriented allowable error weights. These dischargers are, for example, in the form of air cylinders, arranged in the direction of travel of the second conveyor 2 and at right angles thereto. The characters 11, 11'; 12, 12' and 13, 13' designate phototube arrangements for detecting the arrival of articles at the dischargers 8, 9 and 10, and they are provided adjacent to their associated dischargers 8, 9 and 10. The character 14 designates a discharge conveyor for discharging articles having weights other than allowable error weights; 15, a first plus line conveyor for stocking articles having plus-oriented allowable error weights; and the character 16 designates a first minus line conveyor for discharging articles having minus-oriented allowable error weights. These conveyors are positioned laterally of and at right angles to the second conveyor 2 in opposed relation to the dischargers 8, 9 and 10. The characters 17 and 17' designate a phototube arrangement and 18 designates a stopper, these being provided at the terminal end of the first plus line conveyor 15. The characters 19 and 19' designate a phototube arrangement and 20 designates a stopper, these being provided at the terminal end of the first minus line conveyor 16 as in the case of the phototube arrangement 17, 17' and stopper 18 which are provided at the terminal end of the first plus line conveyor 15. The character 21 designates a second plus line conveyor having its initial end positioned at the terminal end of the first plus line conveyor 15 and 22 designates a second minus line conveyor having its initial end positioned at the terminal end of the first minus line conveyor 16. An accumulation conveyor 23 is provided between said conveyors 21 and 22. The characters 24, 25, 26 and 27 designate a first, a second, a third and a fourth discharger, respectively, for the plus line, which are, for example, in the form of air cylinders and positioned on one side of the second plus line conveyor 21 at right angles thereto and spaced from each other at constant intervals. The characters 28 and 28' designate a first phototube arrangement for the plus line; 29 and 29', a second phototube arrangement; 30 and 30', a third phototube arrangement; and 31 and 31' designate a fourth phototube arrangement. They are positioned adjacent to said plus line dischargers 24, 25, 26 and 27. The characters 32, 33, 34 and 35 designate a first, a second, a third and a fourth stopper, respectively, for the plus line, which are positioned adjacent to said plus line dischargers 24, 25, 26 and 27, respectively. Similarly, positioned on one side of the second minus line conveyor 22 are first, second, third and fourth dischargers 36, 37, 38 and 39, a first phototube arrangement 40, 40', a second phototubes 41, 41', a third phototube arrangement 42, 42' and a fourth phototube arrangement 43, 43', and first, second, third and fourth stoppers 44, 45, 46 and 47. These stoppers are arranged so that each is actuated by the detection output of the following phototube, as will be later described. The character 48 designates a chute and 49 designates a box which is transferred below the chute 48, for example, by a conveyor.

Figure 4:
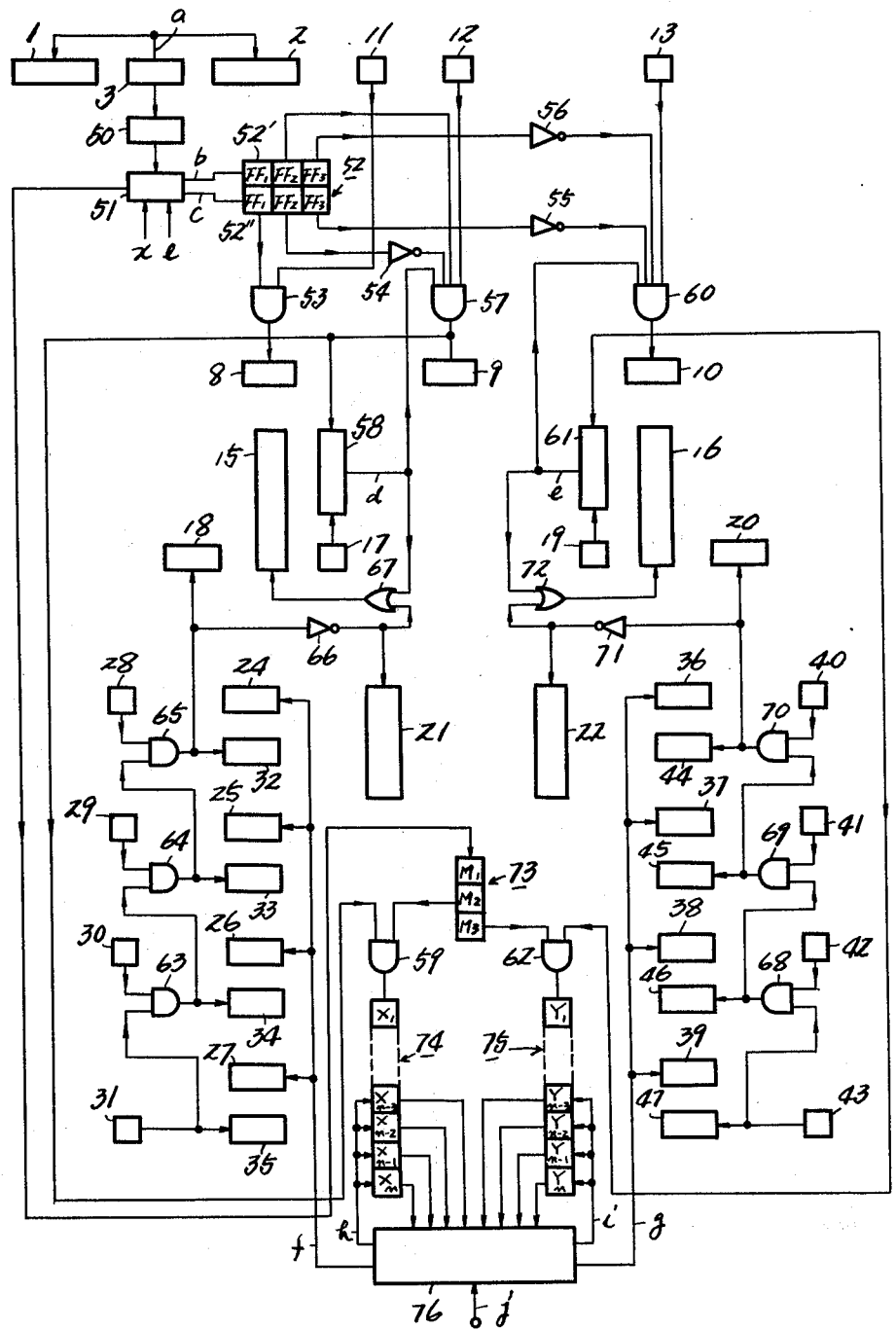

Referring to FIG. 4, the character $a$ designates a weighing completion signal from the weighing machine 3 and this signal serves to move the first and second conveyors 1 and 2 predetermined distances. An A-D converter 50 receives as its input a weight value signal from the weighing machine 3 and has its input connected to the output of a sorter circuit 51. The sorter circuit also receives an average unit weight input $x$ and an allowable error input $e$ whereby it sorts out articles into three ranks according as the weight of an article is plus-oriented including the case of an error weight being zero or minus-oriented with respect to the average unit weight $x$ or it is outside the allowable error limits. The character 52 designates a two-bit shift register consisting of a first bit 52' and a second bit 52", wherein a plus-minus signal $b$ from the sorter circuit 51 with respect to the average unit weight $x$ is connected to the first flip-flop $FF_1$ of the first bit 52' and a right-wrong signal $c$ with respect to the allowable error $l$ is connected to the first flip-flop $FF_1$ of the second bit 52". It is so arranged that the plus-minus signal $b$ becomes an output signal expressing "1" if the weight of an article is greater than (or equal to) the average unit weight $x$ and that it becomes an output signal expressing "0" if the weight of an article is less than the average unit weight $x$. Further, it is so arranged that the right-wrong signal $c$ becomes an output signal expressing "0" if the weight of an article is inside the limits of the allowable error $l$ and that it becomes an output signal expressing "1" if the weight of an article is outside said limits. The character 53 designates an AND circuit which receives as its inputs the output of the phototube 11 and the output of the first flip-flop $FF_1$ of the second bit 52" in the two-bit shift register 52, the output of said AND circuit being connected to the discharger 8. The characters 54, 55 and 56 designate NOT circuits, and connected to their respective inputs are the output of the second flip-flop $FF_2$ of the second bit 52" in the two-bit shift register 52, the output of the third flip-flop $FF_3$ of said second bit and the output of the third flip-flop $FF_3$ of the first bit 52'. An AND circuit 57 receives as its inputs the output of the phototube 12, the output of the second flip-flop $FF_2$ of the first bit 52' in the two-bit shift register 52, the output of the NOT circuit 54 and the output of a plus line counter 58 to be later described. The output of said AND circuit 57 is connected in parallel to the discharger 9, to the addition input of a plus line counter 58, and to the input of an AND circuit 59. Further, an AND circuit 60 receives as its inputs the output of the phototube 13, the outputs of the NOT circuits 55 and 56 and the output of a minus line counter 61 to be later described. The output of said AND circuit 60 is connected in parallel to the discharger 10, to the addition input of a minus line counter 61, and to the input of an AND circuit 62. The output of the phototube 17 is connected to the subtraction input of the plus line counter 58, while the output of the phototube 19 is connected to the subtraction input of the minus line counter 61. These two counters 58 and 61 serve to count the number of articles placed on the first plus line and minus line conveyors 15 and 16, respectively. Thus, each time the discharger 9 or 10 is actuated to transfer an article to the first plus line conveyor 15 or to the first minus line conveyor 16, the plus line counter 58 or the minus line counter 61 carries out addition, and each time an article is transferred from the conveyor 15 or 16 to the second plus line conveyor 21 or the second minus line conveyor 22, subtraction is carried out by means of the detection output of the phototube 17 or 18. It is so arranged that when there are a fixed number of articles on the conveyor 15 and 16, fixed number count signals $d$ and $e$ are fed into the AND circuit 57 or 60, so that the discharger 9 or 10 will not be actuated.

The fourth phototube 31 of the plus line has its output connected to the fourth stopper 35 and to one of the inputs of an AND circuit 63, to the other input of which is connected the output of the third phototube 30. The output of the AND circuit 63 is connected to the third stopper 34 of the plus line and to one of the inputs of an AND circuit 64, to the other input of which is connected the output of the second phototube 29. The output of the AND circuit 64 is connected to the second stopper 33 of the plus line and to one of the inputs of an AND circuit 65, to the other input of which is connected the output of the first phototube 28. The output of the AND circuit 65 is connected to the first stopper 32 of the plus line, to the stopper 18 installed at the terminal end of the first line conveyor 15, and to the input of a NOT circuit 66. Thus, it is so arranged that each stopper remains closed only when the following stopper remains closed. The output of the NOT circuit 66 is connected to the second plus line conveyor 21 and to one of the inputs of an OR circuit 67, to the other input of which is connected the output of the plus line counter 58. The output of the OR circuit 67 is connected to the first plus line conveyor 15. Further, the first, second, third and fourth stoppers 44, 45, 46 and 47 and the first, second, third and fourth phototubes 40, 41, 42 and 43 of the minus line are connected through AND circuits 68, 69 and 70 as in the case of the plus line. The output of the AND circuit 70 is connected to the stopper 20 installed at the terminal end of the first minus line conveyor 18 and to the input of a NOT circuit 71. The output of the NOT circuit 71 is connected to the second minus line conveyor 22 and to one of the inputs of an OR circuit 72, to the other input of which is connected the output of the minus line counter 61. The output of the OR circuit 72 is connected to the first minus line conveyor 16. A common shift register 73 comprises a first memory section $M_1$ to the input of which is connected the output of the sorter circuit 51, a second memory section $M_2$ whose output is connected to the other input of the AND circuit 59 and a third memory section $M_3$ whose output is connected to the other input of the AND circuit 62. A plus line shift register 64 having $n$ memory sections $X_1, \ldots X_n$ has connected to the first memory section $X_1$ thereof the output of the AND circuit 59. Similarly, a minus line shift register having n memory sections $Y_1, \ldots Y_n$ has connected to the first memory section $Y_1$ thereof the output of the AND circuit 62. The shift registers 74 and 75 memorize the error weights of articles placed on the first and second plus line conveyors 15 and 21 and on the first and second minus line conveyors 16 and 22 while effecting shift, and the number of their memory sections, $n$, is equal to the total allowable number of articles which can be placed on the first and second plus line conveyors 15 and 21 or to the total allowable number of articles which can be placed on the first and second minus line conveyors 16 and 22. The character 76 designates an arithmetic unit for combinations, to which are connected the outputs of the $(n-3)$th memory sections $X_{n-3}$, the $(n-2)$th memory sections $X_{n-2}$ and $Y_{n-2}$, the $(n-1)$th memory sections $X_{n-1}$ and $Y_{n-1}$ and the nth memory sections $X_n$ and $Y_n$ of the shift registers 74 and 75. The characters $f$ an $g$ designate discharge signals for causing the discharge operation of the first, second, third and fourth dischargers 24, 25, 26 and 27 of the plus line and the first, second, third and fourth dischargers 36, 37, 38 and 39 of the minus line. The characters $h$ and $i$ designate erasure signals for erasing the error weights memorized by the $(n-3)$th through nth memory sections $X_{n-3}, X_{n-2}, X_{n-1}, X_n$, and $Y_{n-3}, Y_{n-2}, Y_{n-1}, Y_n$ of the shift registers 74 and 75. The character $j$ designates an arithmetic operation start signal. The arithmetic unit 76 for combinations performs arithmetic operations for combinations of the error weights memorized by said eight memory sections $X_{n-3}, \ldots X_n$ and $Y_{n-3}, \ldots Y_n$ to determine such a combination that the error in the total weight of articles packed in a box is minimum with respect to a predetermined weight. In addition, the detection output from each phototube is "1" when it detects an article, while each stopper performs closing operation by "1" input and each conveyor performs traveling operation by "1" input.

The operation of the first form of the present invention constructed in the manner described above will now be described.

When the first article is transferred onto the receiver pan 4 from the first conveyor 1, the receiver pan is raised to a predetermined level where the rollers 5 contact the belt 6. Thereupon, the rollers 5 are rotated by the belt 6, so that the first article is moved to the middle of the receiver pan. When the first article is moved to the middle of the receiver pan, it is detected by the phototube arrangement 7, 7' and the detection output is used to stop the upward movement of the receiving pan. The first article is weighed by the weighing machine 3 and weight value signal is fed into the sorting circuits 51 through the A-D converter 50. The sorting circuit 51 determines the error weight with respect to the average weight $x$ and then determines whether this error weight is inside the limits of the allowable error $l$ or not. If the weight of the first article is greater than the average weight $x$, the plus-minus signal $b$ is "1" while if it is less than that, it is "0". Further, if the error weight is inside the limits of the allowable error $l$, the right-wrong signal $c$ is "0" and it is "1" if it is outside said limits. The signals $b$ and $c$ are fed into the first flip-flops $FF_1$ of the first and second bits 52' and 52" of the two-bit shift register 52, respectively. At the same time, the error weight is memorized in the first memory section $M_1$ of the common shift register 73. The receiving pan 4 is raised again by means of the weighing completion signal $a$ to the predetermined level, where the rollers 5 contact the belt 6 whereby they are rotated again, and at the same time, said weighing completion signal $a$ causes the first and second conveyors 1 and 2 to move predetermined distances. As a result, the second article on the first conveyor is transferred onto the second conveyor, and weighing is carried out in the manner described above while the first article already weighed and placed on the receiving pan is placed on the second conveyor 2 and carried to the position of the discharger 8. In this manner, successive articles are weighed by the weighing machine 3 and intermittently delivered to the second conveyor 2, and the plus-minus signals $b$ and right-wrong signals $c$ from the sorting circuit 51 are successively memorized by the two-bit shift register 52 while effecting shift, and the error weights are successively memorized in the common shift register 73. When the phototube arrangement 11, 11' detects an article, a "1" output from the phototube 11 is fed into the AND circuit 53. At this time, if the error weight of the article is outside the allowable error limits, the output from the first flip-flop $FF_1$ of the second bit 52" of the two-bit shift register 52 is "1", so that the discharger 8 performs discharge operation to discharge said article onto the discharge conveyor 14. Conversely, if the error weight of the article is inside the limits of the allowable error $l$, the output from the first flip-flop $FF_1$ of the second bit 52", so that the discharger 8 does not perform discharge operation. Therefore, this article is transferred to the position of the next discharger 9 along with the movement of the second conveyor 2. When the phototube arrangement 12, 12' detects the article, a "1" output from the phototube 12 is fed into the AND circuit 57. At this time, since the plus line counter 58 has not yet counted up to a fixed number, its output is "1", and if the error weight of the article is plus-oriented inside the limits of the allowable error $l$, the output from the second flip-flop $FF_2$ of the first bit 52" of the two-bit shift register 52 is "1" and the output from the second flip-flop $FF_2$ of the second bit 52' is "0". Consequently, the output from the NOT circuit 54 is "1". The "1" output from the AND circuit 57 actuates the discharger 9 to discharge the article to the first plus line conveyor 15, and 1 count is added by the counter 58. At the same time, the plus-oriented error weight of this article memorized in the second memory section $M_2$ of the common shift register 73 is memorized in the first memory section $X_1$ of the plus line shift register 74 through the AND circuit 59. Conversely, if the error weight of the article detected by the phototube arrangement 12, 12' is minus-oriented inside the limits of the allowable error $l$ (articles whose error weights are outside the allowable error limits have already been discharged to the discharge conveyor 14 by the discharger 8), the output from the second flip-flop $FF_2$ of the first bit 52' is "0" and hence the output from the AND circuit 57 remains "0". Therefore, the discharger 9 does not perform discharge operation. Further, even if an article has a plus-oriented error weight inside the limits of the allowable error $l$, the discharger 9 would not perform discharge operation if the counter 58 has already counted up to a fixed number, since in that case a fixed number count signal $d$ which is "0" is fed into the AND circuit 57. When the discharger 9 does not perform discharge operation, the plus line counter 58 does not perform addition, nor does the plus line shift register 74 memorize the error weight memorized in the second memory section $M_2$ of the common shift register 73. The article which was not discharged by the discharger 9 is transferred to the position of the discharger 10 by the next movement of the second conveyor 2. When the phototube arrangement 13, 13' detects an article, the "1" input from the phototube 13 is fed into the AND circuit 60, and, as in the case of the phototube arrangement 12, 12' detecting an article, an article having a minus-oriented error weight inside the limits of the allowable error $l$ is discharged to the first minus line conveyor 16 by the discharger 10 and 1 count is added by the minus line counter 61. The minus-oriented error weight memorized in the third memory section $M_3$ of the common shift register 73 is memorized in the first memory section $Y_1$ of the minus line shift register 75. In the case where an article detected by the phototube arrangement 13, 13' has an error weight plus-oriented inside the limits of the allowable error $l$ or the minus line counter 61 has already counted up to a fixed number, the output therefrom is "0". Therefore, even with an article having an error weight minus-oriented inside the limits of the allowable error $l$, the output from the AND circuit 60 remains "0", so that the discharger 10 does not perform discharge operation. Consequently, the minus line counter 61 does not perform addition, nor does the minus line shift register 75 memorize the error weight memorized in the third memory section $M_3$ of the common shift register 73. Therefore, as the second conveyor runs, this article is discharged at the terminal end of the run.

In this manner, articles having error weights plus-oriented inside the allowable error limits are successively discharged from the second conveyor 2 to the first plus line conveyor 15, while articles having error weights minus-oriented inside the allowable error limits are successively discharged to the first minus line conveyor 16. The error weights of such discharged articles are memorized in the plus line and minus line shift registers 74 and 75. Each time articles are discharged to the first plus line and first minus line conveyors 15 and 16, addition is performed count by count by the plus line and minus line counters 58 and 61. When articles are fed from the first plus line and first minus line conveyors 15 and 16 onto the second plus line and second minus line conveyors 21 and 22, they are detected by the phototube arrangements 17, 17' and 19, 19' and the detection outputs "1" from the phototubes 17 and 19 cause the plus line and minus line counters 58 and 61 perform subtraction count by count. When an article carried by the second plus line conveyor 21 or the second minus line conveyor 22 reaches the fourth phototube arrangement 31, 31' of the plus line or the fourth phototube arrangement 43, 43' of the minus line, the output from the phototube 31 or 43 becomes "1", actuating the fourth stopper 35 of the plus line or the fourth stopper 47 of the minus line to prevent the travel of the article. When the next article is detected by the third phototube arrangement 30, 30' of the plus line or the third phototube arrangement 42, 42' of the minus line, the detection output from the phototube 30 or 42 becomes "1" and this output cooperates with the "1" output from the phototube 31 or 43 to cause the AND circuit 63 or 68 to produce a "1" output. Thus, the third stopper 34 of the plus line or the third stopper 46 of the minus line is actuated to prevent the travel of the article. With the first stoppers 32 and 44 of the plus line and minus line actuated in this manner, when four articles are stocked on each of the second minus line conveyors 21 and 22, the outputs from the AND circuits 65 and 70 become "1", causing the actuation of the stoppers 18 and 20, whereupon the articles on the first plus line and first minus line conveyors 15 and 16 are prevented from being transferred to the second plus line conveyors 21 and 22, respectively. Concurrently therewith, the outputs from the NOT circuits 66 and 71 each become "0", thereby stopping the travel of the second plus line and second minus line conveyors 21 and 22. When a fixed number of articles are stocked on the first plus line conveyor 15 and on the first minus line conveyor 16, fixed number count signals $d$ and $e$ which are "0" are fed from the plus line and minus line counters 58 and 61 into the AND circuits 57 and 60 and also into the OR circuits 67 and 72, respectively. The outputs from the OR circuits 67 and 72 become "0" and the travel of the first plus line and first minus line conveyors 15 and 16 is stopped. The error weights of the four articles stocked on the second plus line conveyor 21 and on the second minus line conveyor 22, respectively, are memorized in the $(n-3)$th to $n$th memory sections $X_{n-3}$ to $X_n$ of the plus line shift register 74 and the $(n-3)$th to $n$th memory sections $Y_{n-3}$ to $Y_n$ of the minus line shift register 75, respectively.

Next, an arithmetic operation start signal $j$ actuates the arithmetic unit 76 for combinations to perform arithmetic operations for combinations of the error weights memorized in the 8 memory sections $X_{n-3}$–$X_n$ and $Y_{n-3}$–$Y_n$ of the shift registers 74 and 75 to provide a combination having a minimum total error weight. Upon completion of operations, the discharge signals $f$ and $g$ actuate the first to fourth dischargers 24, 25, 26 and 27 of the plus line and the first to fourth dischargers 36, 37, 38 and 39 of the minus line to discharge the corresponding articles onto the accumulation conveyor 23. At the same time, of the error weights memorized in the $(n-3)$th to $n$th memory sections $X_{n-3}, \ldots X_n$ and $Y_{n-3}, \ldots Y_n$ of the plus line and minus line shift registers 74 and 75, those corresponding to the discharged articles are erased by erasure signals $h$ and $j$. When an article is discharged, the output from the phototube which has detected said article becomes "0", so that the output from the AND circuit 65 or 70 becomes "0". Therefore, the second plus line conveyor 21 or the second minus line conveyor 22 is moved again whereby the articles which have not been discharged are conveyed. At the same time, the stopper 18 or 20 which has been in its closed position is opened and the output from the OR circuit 67 or 72 becomes "1", thereby moving the first plus line arithmetic conveyor 15 or the first minus line conveyor 16. Again, articles are delivered onto the second plus line conveyor 21 or the second minus line conveyor 22 until four articles are placed on the second plus line conveyor 21 and on the second minus line conveyor 22, whereupon the output from the AND circuit 65 or 70 becomes "1" as described above. Thus, the stopper 18 or 20 performs closing operation to prevent the delivery of articles and the travel of the second plus line conveyor 21 or second minus line conveyor 22. Further, when the plus line counter 58 or minus line counter 61 has counted up to a fixed number, the travel of the first line conveyor 15 or first minus line conveyor 16 is stopped, as described above. Again, an arithmetic operation start signal $j$ causes the arithmetic unit 76 to perform arithmetic operations, whereby a combination of articles which gives a minimum total error weight is delivered onto the accumulation conveyor 23. Thereafter, the above-described operations are repeated.

Figure 5:
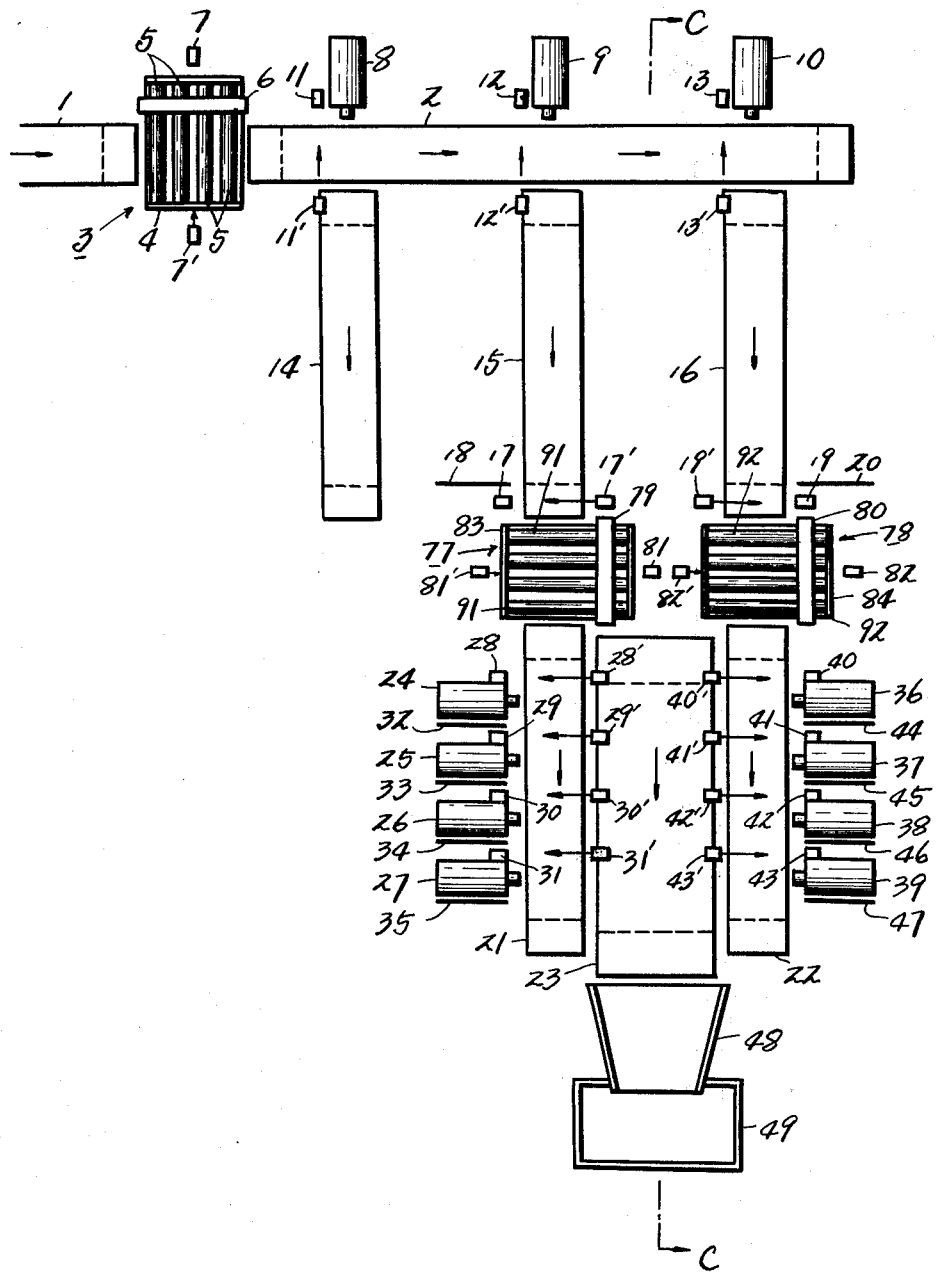

The second and third forms of the present invention will now be described with reference to FIG. 5 et seq.

Figure 6:
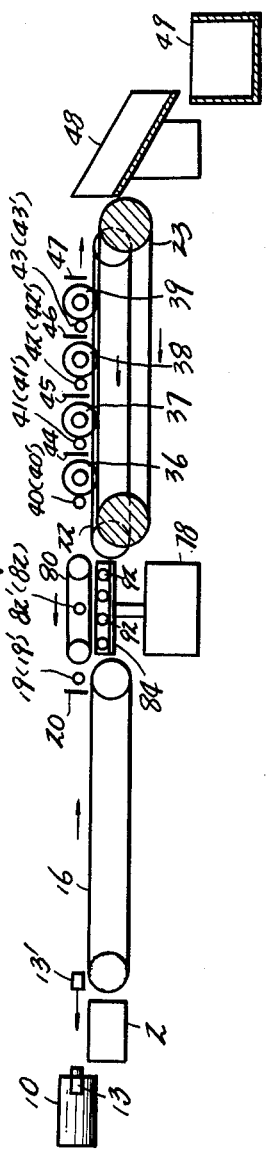

In addition, those parts which perform the same functions as or similar functions to those in the first form of the present invention are marked with the same or similar reference characters. The second form of the invention will first be described with reference to FIGS. 5 through 7. The second form of the invention comprises a plus line weighing machine 77 disposed between the first plus line conveyor 15 and the second plus line conveyor 21 and a minus line weighing machine 78 disposed between the first minus line conveyor 16 and the second minus line conveyor 22. The characters 79 to 80 designate conveyors, which, as in the first form of the invention, are fixed in position above the weighing machines 77 and 78. The characters 81, 81'; 82, 82' designate phototube arrangements for detecting the arrival of an article at the middle of the receiver pans 83 and 84 of the weighing machines. The characters 85 and 86 designate A-D converters for converting the plus-oriented and minus-oriented error weights of articles weighed by the plus line and minus line weighing machines 77 and 78 into BCD codes, the outputs of said converters being connected to the first memory sections $X_1$ and $Y_1$ of the plus line and minus line shift registers 74' and 75', respectively. The shift registers 74' and 75' have four memory sections $X_1, \ldots X_4$ and $Y_1, \ldots Y_4$, respectively, whose outputs are connected to the arithmetic unit 76. On the other hand, the outputs of the AND circuits 77 and 78 are connected to the weighing machines 77 and 78 and also to OR circuits 87 and 88, while "1" weighing completion signals $k$ and $l$ from the weighing machines are connected to the other inputs of said OR circuits 87 and 88 through AND circuits 89 and 90, respectively. The outputs of the OR circuits 87 and 88 are connected to the stoppers 18 and 20, respectively. In addition, the characters 91 and 92 designate rollers rotatably mounted on the receiver pan 83 and 84, respectively. In the second form of the invention, articles delivered from the first plus line and first minus line conveyors 15 and 16 are weighed by the plus line and minus line weighing machine 77 and 78, the error weights thus measured are memorized in the plus line and minus line shift registers 74' and 75' and arithmetic operations for combinations are performed. In addition, the stoppers 18 and 20 are in their closed position when the first stoppers 32 and 44 of the plus line and minus line are in their closed position, but when the first stoppers 32 and 34 are not closed, they are opened by "1" weighing completion signals $k$ and $l$ from the plus line and minus line weighing machines 77 and 78.

Figure 9:
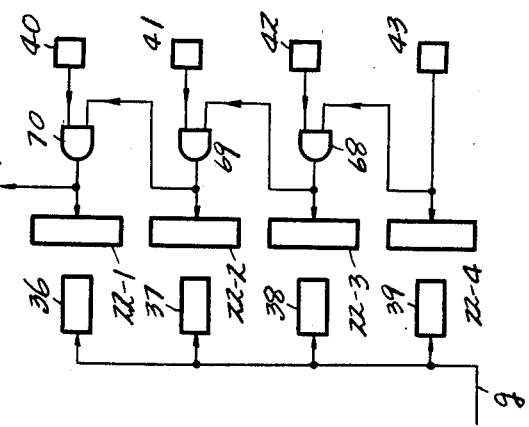
FIGS. 8 and 9 are views showing another embodiment of the second minus line conveyor in the first and second embodiments.
Figure 8:
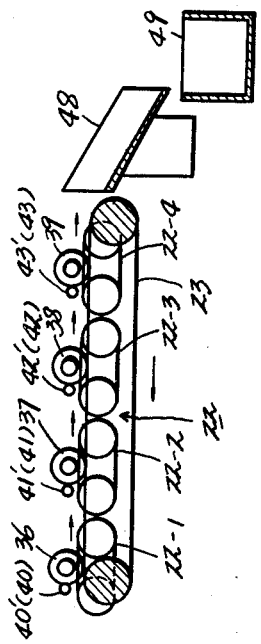

In the first and second forms of the present invention described so far, the second plus line and second minus line conveyors 21 and 22 have been shown each in the form of a single conveyor, but four conveyors may be used for each, so that each conveyor may carry a single article alone. In that case, the travel of each conveyor is controlled by the output from a phototube, so that it becomes unnecessary to provide a stopper. More particularly, if reference is made to the second minus line conveyor 22, as shown in FIGS. 8 and 9, when the fourth phototube 43' of the minus line detects an article, the "1" detection output therefrom stops the travel of a conveyor 22-3. This output cooperates with the detection output from the third phototube 42' when the latter detects the article to stop the travel of a conveyor 22-3. The "1" output from the AND circuit cooperates with the "1" detection output from the second phototube 41 when the latter detects the article to stop the travel of a conveyor 22-2. The "1" output from the AND circuit 69 cooperates with the "1" detection output from the first phototube 40' when the latter detects the article to stop the travel of a conveyor 22-1. In this case, the NOT circuits 66 and 71 in FIGS. 4 and 7 have their outputs, of course, connected only to the OR circuits 67 and 72, respectively.

Figure 11:
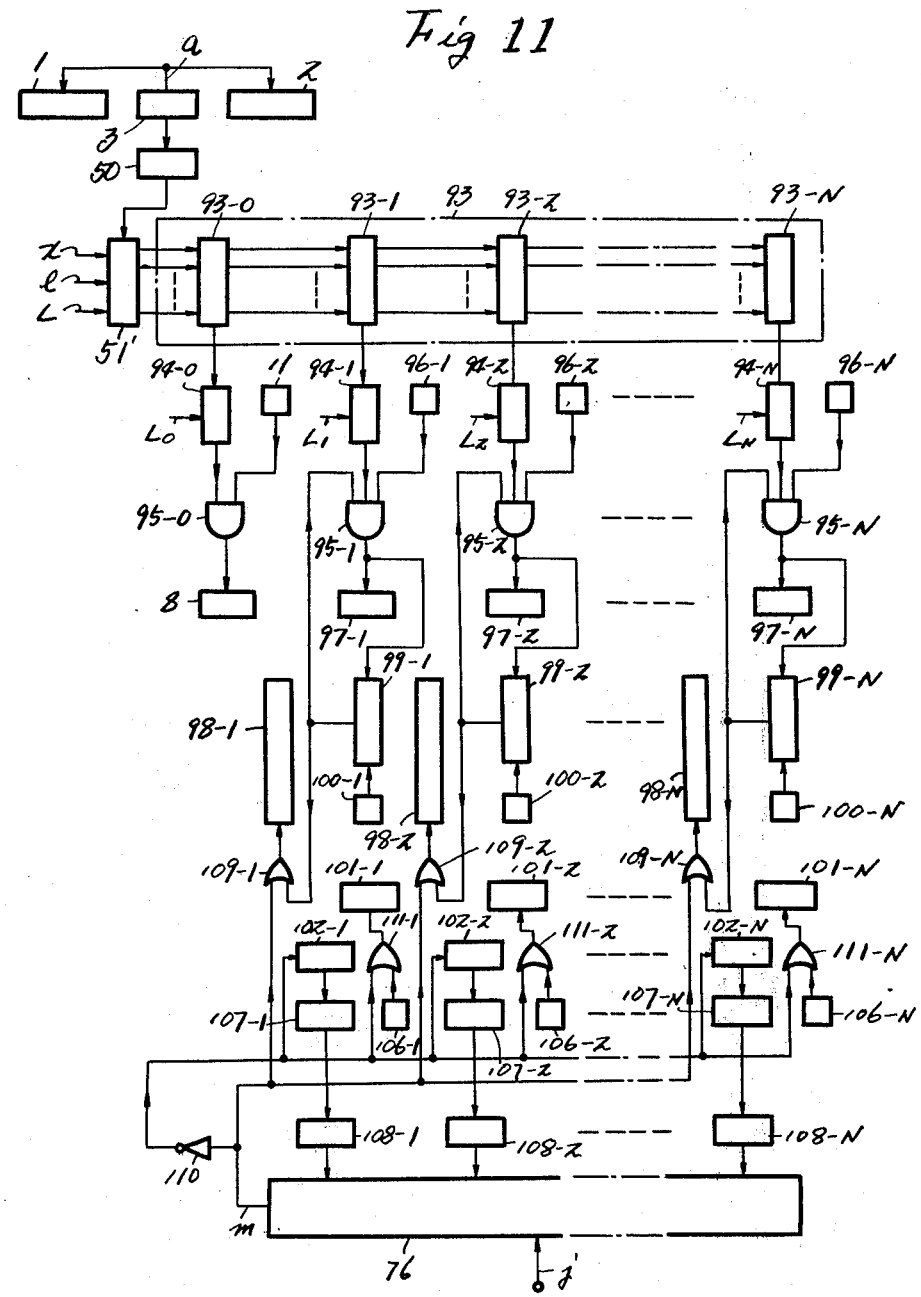

In the first and second forms of the present invention, articles have been classified into three ranks, namely, a first rank for articles having error weights outside the allowable error limits, a second rank for articles having error weights plus-oriented inside the allowable error limits and a third rank for articles having error weights minus-oriented inside the allowable error limits. A third form of the present invention will now be described with reference to FIGS. 10 and 11 wherein articles are classified into $n=1$ ranks, namely, a rank for articles having error weights outside the allowable error limits and $n$ ranks for articles having error weights inside the allowable error limits.

The character 51' designates a sorting circuit wherein the error weights of articles which have been weighed are classified into $n+1$ ranks by means of an average unit weight input $x$, an allowable error input $l$ and a rank input $L_n$ representing rank inputs $L_0, L_1, \ldots L_n$ where allowable error is divided into $n$ ranks. The decimal digit values $1, 2, \ldots n$ where articles have error weights inside the first, second, ... nth ranks of allowable error limits, respectively, are fed into the first shift register 93-0 of $n+1$ registers 93-0, 93-1, ... 93-$n$ by means of BCD cord. The outputs of the $n+1$ registers 93-0, 93-1, ... 93-$n$ are connected to coincidence circuits 94-0, 94-1, ..., 94-$n$, respectively, while the outputs of the latter are connected to one of the respective inputs of AND circuits 95-0, 95-1, ... 95-$n$. The output of a phototube 11 is connected to the other input of the AND circuit 95-0 and the outputs of $n$ phototubes 96-1, 96-2, ... 96-$n$ are connected to the other inputs of the AND circuits 95-2, ... 95-$n$, respectively. The outputs of the AND circuits 95-0, 95-1, ... 95-$n$ are connected to dischargers 8, 97-1, 97-2, ... 97-$n$, respectively. The characters 98-1, 98-2, ... 98-$n$ designate the first through nth conveyors for carrying articles having error weights inside the n ranks of allowable error limits. Each of the registers 93-0, 93-1, ... 93-$n$ has as many bits as are necessary for memorizing the highest of the decimal numbers fed from the sorting circuit 51'. For example, in the case of the decimal number $n$ being 8 (and hence it follows that the allowable error has been divided into 8 ranks), this BCD code has 4 bits. Therefore, each of the registers 93-0, 93-1, ... 93-$n$ may be a 4-bit register. The characters $L_0, L_1, \ldots L_n$ designate rank inputs connected to the coincidence circuits 94-0, 94-1, ... 94-$n$. When such input coincides with the output of a corresponding register 93-0, 93-1, ... 93-$n$, a "1" output is fed into a corresponding AND circuit 95-0, 95-1, ... or 95-$n$. The characters 99-1, 99-2, . . . 99-$n$ designate the first through $n$th counters which perform addition operation with the "1" outputs of the AND circuits 95-1, 95-2, . . . 95-$n$, respectively, and perform subtraction operation with the "1" outputs of the phototubes 100-1, 100-2, . . . 100-$n$ of phototubes arrangements 100-1, 100-1'; 100-2, 100-2'; . . . ; 100-$n$ 100-$n$' installed at the terminal ends of the first through $n$th conveyors 98-1, 98-2, . . . 98-$n$. The characters 101-1, 101-2, . . . 101-$n$ designates stoppers installed at the terminal ends of the conveyors 98-1, 98-2, . . . 98-$n$, respectively: The characters 102-1, 102-2, . . . 102-$n$ designate weighing machines installed at the terminal ends of the conveyors 102-1, 102-2, . . . 102-$n$, respectively: The characters 102-1, 102-2, . . . 102-$n$ designate weighing machines installed at the terminal ends of the conveyors 102-1, 102-2, . . . 102-$n$, respectively: The characters 103-1, 103-2, . . . 103-$n$ designate belts for rotating rollers 105-1, 105-2, . . . 105-$n$ rotatably mounted on the receiver pans 104-1, 104-2, . . . 104-$n$ of the weighing machines 102-1, 102-2, . . . 102-$n$. These are of the same construction as in the first form of the present invention.

Error weight signals from the weighing machines 102-1, 102-2, . . . 102-$n$ are memorized in registers 108-1, 108-2, . . . 108-$n$ through A-D converters 107-1, 107-2, . . . 107-$n$, the outputs of said registers being connected to an arithmetic unit 76 for combination. A discharge signal $m$ is connected to the weighing machines 102-1, 102-2, . . . 102-$n$ and to one of the respective inputs of OR circuits 111-1, 111-2, . . . 111-$n$ through a NOT circuit 110. Connected to the other inputs of the OR circuits 111-1, 111-2, . . . 111-$n$ are the outputs of the phototubes 106-1, 106-2, . . . 106-$n$. The outputs of the OR circuits 111-1, 111-2, . . . 111-$n$ are connected to the stoppers 101-1, 101-2, . . . 101-$n$, respectively.

In the third form of the present invention, articles are successively weighed by the weighing machine 3, the error weights with respect to the average weight $x$ are classified into $n+1$ ranks by the sorting circuit 50' and sorted signals are fed into the first register 93-0 of the shift registers 93 by means of BCD code. Each time an article is weighed, the sorted signal is shifted and memorized in the shift register 93. When articles are detected by the phototubes 96-1, 96-2, . . . 96-$n$, if the rank inputs $L_0, L_1, \ldots L_n$ coincide with the outputs of the registers 93-0, 93-1, . . . 93-$n$, the outputs of the coincidence circuits 94-0, 94-1, . . . 94-$n$ become "1", so that the outputs of the AND circuits 95-0, 95-1, . . . 95-$n$ becomes "1", whereby the corresponding dischargers 8, 97-1, 97-2, . . . 97-$n$ are actuated to discharge the articles onto the conveyors 14, 98-1, 98-2, . . . 98-$n$. And the counters 99-1, 99-2, . . . 99-$n$ add 1 count. Further, when the two inputs of the coincidence circuits 94-0, 94-1, . . . 94-$n$, that is, the rank inputs $L_0, L_1, \ldots L_n$ and the outputs of the registers 93-0, 93-1, . . . 93-$n$ do not coincide with each other, or when the counters 99-1, 99-2, . . . 99-$n$ have counted up to a fixed number, the outputs of the coincidence circuits 94-0, 94-1, . . . 94-$n$ are "0" or the outputs of the counters 99-1, 99-2, . . . 99-$n$ are "0", so that the outputs of the AND circuits 95-0, 95-1, . . . 95-$n$ are "0" and hence the dischargers 8, 97-1, 97-2, . . . 97-$n$ do not operate. Therefore, the articles are not discharged but transferred to the position of the next discharger.

In this way, articles are classified into $n+1$ ranks, namely, articles having error weights outside the allowable error limits and articles having error weights inside the $n$ ranks of allowable error limits and alloted to the conveyors 14, 98-1, 98-2, . . . 98-$n$. The thus sorted and alloted articles having error weights inside the allowable error limits are weighed again by the weighing machines 102-1, 102-2, . . . 102-$n$ and the error weights are memorized in the registers 108-1, 108-2, . . . 108-$n$. On the basis of these memorized error weights, the arithmetic unit 76 performs arithmetic operations to provide a combination having a minimum error weight. Upon completion of operations, by means of a discharge signal $m$ articles corresponding to said minimum error weight combination are discharged from the weighing machines onto the accumulation conveyor 23, the corresponding stoppers among the stoppers 101-1, 101-2, . . . 101-$n$ are opened, and the corresponding conveyors among the conveyors 98-1, 98-2, . . . 98-$n$ are moved to deliver the articles to the corresponding weighing machines among the weighing machines 102-1, 102-2, . . . 102-$n$ to weigh the articles again. The opened stoppers are closed by the detection outputs of the corresponding phototubes among the phototubes 106-1, 106-2, . . . 106-$n$ when the next articles arrive at the centers of the corresponding receiver pans 104-1, 104-2, . . . 104-$n$ of the weighing machines. The error weights of said weighed articles are memorized in the corresponding registers among the registers 108-1, 108-2, . . . 108-$n$. In addition, the articles which have not been discharged remain on the weighing machines and their error weights are used for the next arithmetic operation for combinations. In this manner, arithmetic operations for combinations providing minimum error weights with respect to the predetermined weight are successively performed and the corresponding articles are discharged onto the accumulation conveyor 23 and packed in a box 49.

From the foregoing description, it is understood that the error weights of articles which are inside the allowable error limits with respect to the average unit weight are memorized in the common shift register 73 and the plus line and minus line shift registers 74 and 75 in the first form of the present invention, in the plus line and minus line shift registers 74' and 75' in the second form of the invention, and in the registers 108-1, 108-2, . . . 108-$n$ in the third form of the invention. On the basis of these error weights, calculations have been performed in the arithmetic unit 76 to provide a combination of articles having a minimum error weight, but it is also possible to memorize the unit weights of articles instead of the error weights thereof and perform calculations on the basis of the unit weights to provide a combination of articles having a minimum error weight. Further, in the first and second forms of the present invention, the number of error weights used in arithmetic operations for combination has been 8, consisting of 4 plus-values and 4 minus-values, but it is, of course, not limited to 8.

As has been described so far, in the first form of the invention, articles are weighed and classified into 3 ranks, one for articles having error weights outside the allowable error limits, another for articles having error weights plus-oriented inside the allowable error limits and the other for articles having error weights minus-oriented inside the allowable error limits, and the weights or error weights of said articles having error weights inside the allowable error weights are allotted to and memorized in two shift registers and arithmetic operations for combinations of these memorized values are performed to provide a predetermined weight or a weight most approximate thereto. In the second form of the invention, articles are classified into 3 ranks as in the second form of the invention, and the weights or error weights of articles having error weights inside the allowable error limits are measured by the second and third weighing machines and allotted to the memorized in two shift registers and arithmetic operations for combinations of these memorized values are performed to provide a predetermined weight or a weight most approximate thereto. In the third form of the invention, articles are weighed and classified into $n+1$ ranks, one for articles having error weights outside the allowable limits and $n$ ranks for articles having error weights inside the allowable error limits. The weights or error weights of said articles having error weights inside the allowable error limits classified into the $n$ ranks are measured by weighing machines associated with the respective ranks and memorized in registers associated with the respective ranks, and arithmetic operations for combinations of the values memorized in these $n$ registers to provide a predetermined weight or a weight most approximate thereto. As a result of said arrangement, variations in the unit weights of articles do not influence the accuracy of measurement, so that it is possible to perform weighing operation while achieving the required number of articles and the predetermined weight or a weight most approximate thereto. Further, even if articles having unit weights primarily deviated toward one side happen to appear, there will be no trouble to arithmetic operations for combinations since such articles are stocked on the respective conveyors. Particularly, in the first and second forms of the invention, since the registers for memorizing the weights or error weights of articles have a shifting function, it is possible to use a single weighing machine to successively weigh a plurality of articles and accordingly the apparatus can be manufactured at low cost. The construction in the first form of the invention is simplest and the control and adjustment thereof are simplest and easiest. In the second form of the invention, the change of articles is allowed before they are weighed by the second and third weighing machines. In the third form of the invention, the accuracy of weighing operation for combination is highest, providing stabilized accuracy at all times, and the weighing rate is highest and the frequency at which the weighing machines are used is lowest and hence the durability is high. Moreover, it is most suitable when the predetermined number of articles is large. It saves labor in boxing operation and contributes much to the decrease of loss due to largish weighing while accelerating the boxing operation.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed:

1. A method of automatically weighing a plurality of articles having varying weights to produce a collection of said articles meeting a predetermined total weight of a group of the articles comprising weighing each of the articles in a single weighing zone; storing the weight value of each article in a memory unit; passing the weighed articles to a classifying and separating zone to transfer the weighed articles one at a time into either a discard section, an allowable plus section, or an allowable minus section, said passing depending upon the stored weight value for each article; passing each article from each of said allowable plus section and said allowable minus section into a first discharge section and a second discharge section respectively; determining, on the basis of the stored weight value of each article, which combination of weighed articles in said first discharge section and said second discharge section meets the predetermined total weight value selected; passing the selected combination of weighed articles to meet the total weight value to an accumulation zone, and removing the weight value of each article selected for passage to the accumulation zone from the memory unit.

2. A method in accordance with claim 1, wherein the initial weight of each article is not stored in a memory unit and the weighed articles are thereafter passed from the allowable plus section to a second weighing zone before passage to the first discharge section and the weighed articles are passed from the allowable minus section to a third weighing zone before passage to the second discharge zone, and the individual weight values obtained at the second and third weighing zones are passed to the memory unit.

3. An article handling apparatus for weighing a plurality of articles having varying weights to produce a collection of the weighed articles which will substantially meet a predetermined selected weight for a group of such articles comprising a weighing station, means for feeding the articles of varying weights to said weighing station one at a time, electrical means for memorizing the weight of each individual article as it is weighed, an article separating station positioned at the discharge end of the weighing station, said separation station including a first reject station, a second allowable weight plus section, a third allowable weight minus section, and discharge means adjacent each section for passing a weighed article, dependent on its weight value, to one of the three aforementioned sections, article accumulation means associated with said second weight plus station and said weight minus section for receiving selected articles therefrom, means for selectively receiving from the memorizing means the combination of weight values of the individual articles in the second and third sections which approximate the desired predetermined total weight of a plurality of articles, means actuated by said selectively receiving means for discharging the individual articles from the first and second sections or combinations thereof whose weight values have been selected as approximating the predetermined total weight into the article accumulating means, and means for erasing the weight value of each of the articles selected to make up the collection of articles passed to the article accumulating means from the electrical memorizing means.

4. An article handling apparatus in accordance with claim 3, wherein a first discharge section and a second discharge section are positioned in an aligned row forward of the second allowable weight plus section and the third allowable weight minus section respectively to receive the weighed articles from their respective associated section before passage to the article accumulation means.

5. An article handling apparatus in accordance with claim 3, wherein a second weighing station is positioned between the second allowable weight plus section and the article accumulation means, a third weighing station is positioned between the third allowable weight minus section and the article accumulation means, and electrical memorizing means associated with each of said second weighing station and said third weighing station respectively for memorizing the individual weight value of each of said articles, with such memorized value constituting the memorized means for discharging the selected weight articles to the article accumulation means.

6. An article handling apparatus in accordance with claim 4, wherein a second weighing station is positioned between the second allowable weight plus section and the first discharge section and a third weighing station is positioned between the third allowable weight minus section and the second discharge section and electrical memorizing means associated with each of said second weighing station and said third weighing station respectively for memorizing the weighed value of each of said articles, with such memorized values constituting the memorized means for discharging the selected weighed articles to the article accumulating means.

* * * * *